May 25, 1926. 1,586,376
J. S. MILLER, JR
TREATMENT OF OILS AND HYDROCARBONS
Filed Sept. 23, 1920
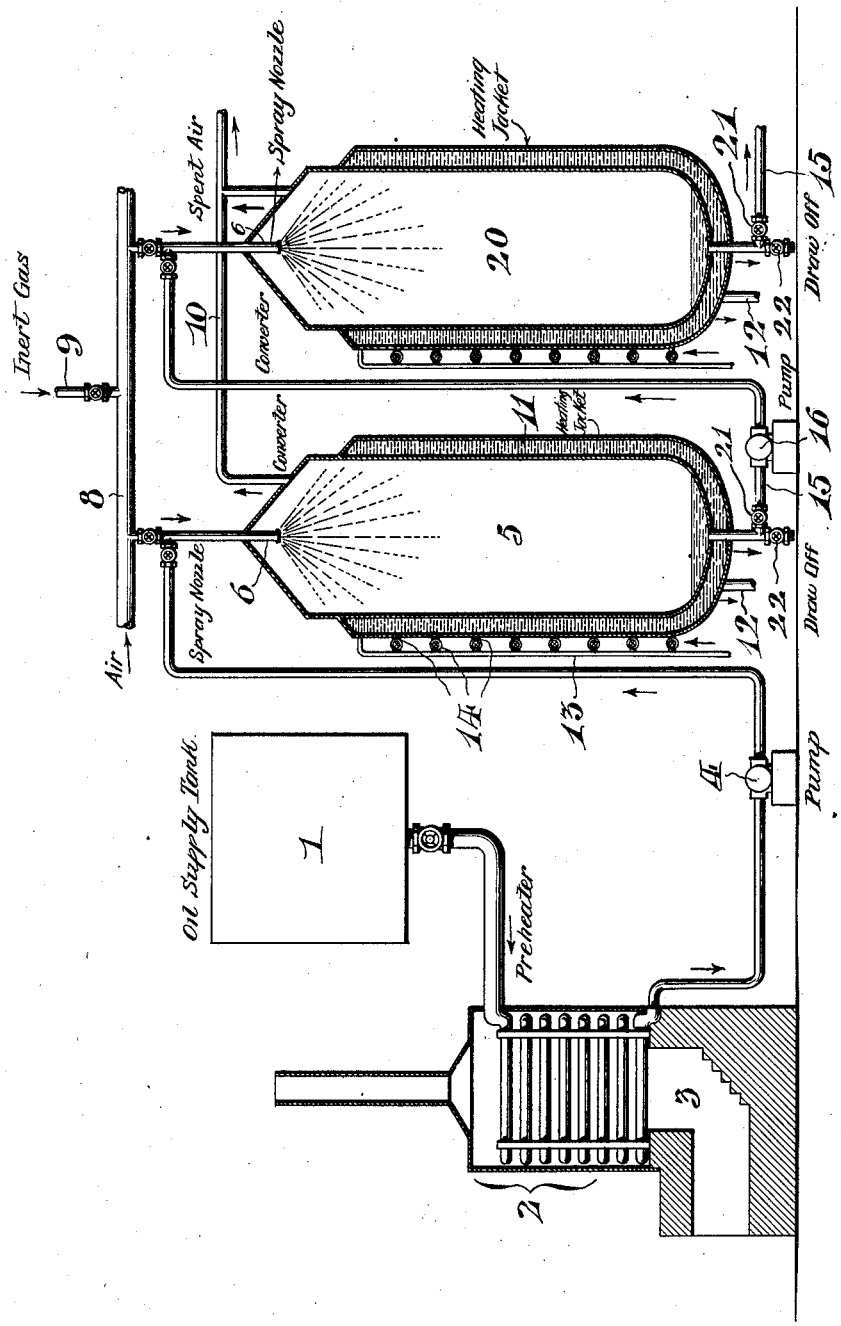
WITNESSES:
INVENTOR:
John Strother Miller, Jr.,
BY
ATTORNEYS.

Patented May 25, 1926.

1,586,376

UNITED STATES PATENT OFFICE.

JOHN STROTHER MILLER, JR., OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

TREATMENT OF OILS AND HYDROCARBONS.

Application filed September 23, 1920. Serial No. 412,270.

My invention relates to the treatment of oils and hydrocarbons while in the liquid state (whether freely fluid like water, or of more viscous consistency) with gaseous reagents to obtain chemically modified products. The invention is applicable to a great variety of liquid and liquefiable hydrocarbons and bituminous materials of mineral origin, such as water-gas and coal tars; natural and artificial asphalts; and petroleum and its oils and residuums; which are non-drying. For convenience, I have hereinafter referred to the materials treated as bases or "oils", simply. My invention is particularly concerned with treatment of such materials to yield products of the "blown" type, as they are termed, resulting from a modification of the material treated in the nature of chemical condensation.

In producing products of this character from bituminous bases by means of gaseous condensation agents, it has been the general practice to bubble or "blow" the gas through a liquid or liquefied mass of the base,—with or without the use of a catalytic reagent, at suitable, reactive temperature. In the manufacture of oxidized bituminous products of this gas-treated, "blown" type, in particular, (such as "blown" oils, asphalts, and tars), it has been customary to employ air as the gaseous agent, and to pass relatively large volumes of the air through the bituminous base. The exact nature and mechanism of the effect produced by such treatment is obscure, and doubts are entertained by some persons as to whether the base is actually oxidized to any substantial extent; but it is unquestioned that by the treatment a chemical condensation of certain components of the base is effected, the air or its oxygen being the effective condensation agent. The bituminous base thus treated is usually heated to render it more freely fluid and to promote reaction; and heating of the air for the same purpose has also been suggested. The finer the bubbles or globules of air, the more rapid the reaction and the greater the effect at a given temperature. There is, however, a limit to the degree of fineness to which the air bubbles or globules can advantageously be brought; for the finer the globule of air desired, the finer must be the opening from which the air is blown or released, and the finer this opening, the more rapidly said opening becomes clogged in consequence of intense localized reaction, which results in the formation of solid carbonaceous material in and about the opening. The ultimate result of the attempt to make the air bubbles excessively fine is, indeed, a slowing down of the reaction, owing to the failure to pass a sufficient volume of air.

I have discovered that by reversing the operation and exposing liquid or liquefied bases in the form of small droplets or globules to an atmosphere of gaseous reagent, much more efficient and rapid reaction will be obtained; since under these conditions the gaseous agent completely surrounds the fine particles or globules. By means of various mechanical spray nozzles adapted to spray liquid bituminous materials, or of atomizing nozzles of the air-jet type, the particles of liquid base can be reduced to almost or substantially an "atomized" condition. For this treatment, the base may be heated to any temperature not, in general, exceeding its ignition temperature,—at which the reaction would spontaneously become violent or uncontrollable, or high enough to vaporize and distill it.

In the case of some types of oils (especially those that are very susceptible), the active gaseous agent at full strength or in its natural condition may prove too vigorous for the oil-globule method of treatment. With these highly reactive oils, therefore, some regulation of the treatment may be necessary, either to prevent exothermic reaction from proceeding so rapidly as to cause excessive heating and even spontaneous ignition of the oil, or to restrain the reaction for some other reason. Regulation can be effected, I have found, by reducing or rendering less active the oxygen content of the air,—as by diluting the air with a more or less inert gas such as carbon dioxide or producer gas. This latter may be done either by direct addition and admixture of the diluent inert gas with the air entering the sphere of reaction, or by employing the diluent as a pressure agent in the air-jet of a liquid-atomizing nozzle, or in both ways at once. More or less frequent or continuous change of the body of gaseous reagent to which the liquid globules are exposed is desirable if the treatment is to go on for any length of time. If the cost of the gaseous agent used warrants, it may, of course, be regenerated and used over and over again,—as by purifying it of contamination from the treatment and replacing its losses of the reactive agent or components.

For the benefit of those desiring to practice my invention, I will now describe in detail the treatment with atmospheric air of a base consisting of a fluid petroleum residuum, as well as a plant and apparatus suitable and advantageous for treating this and various other bases with air and other gases.

In the accompanying drawings, I have illustrated a plant suitable for the practice of my invention, showing various units or portions of the apparatus in sectional elevation.

As here shown, the supply of base is contained in a reservoir or tank 1 conveniently elevated to secure gravitational passage of the oil through a pre-heater 2 comprising a system of pipe coils or convolutions and resembling an independently-fired superheater. The coil of the pre-heater 2 may be heated from a furnace 3 fired with liquid hydrocarbon or other suitable fuel. A petroleum residuum well adapted to the treatment is one having a closed cup flash point of not less than 350° F. (as a matter of economy and safety), and a viscosity at 150° F. of from 35 to 75 seconds (float sink test). This base should be heated in the pre-heater 2 to such a temperature as will give it sufficient fluidity to be easily pumped,— preferably to not less than 250° F. and not more than 325° F., which is a range of temperature at which it is more reactive than at ordinary temperatures, and yet well below both its flash point and its ignition point. The best initial temperature range may vary somewhat for different bases, since it depends on other characteristics besides flash: e. g., some oils oxidize much more readily than others, and can, or must, therefore, be treated at lower temperatures.

From the pre-heater 2, the base is pumped by a pump 4 to the top of a converter 5 whereinto it is sprayed through a nozzle device 6. Thus it is atomized or reduced to a suitably fine globular state of division and exposed to an atmosphere of the gaseous treating agent or air. The air to which the heated oil is thus exposed is, of course, itself quickly heated by contact with the latter; but it may also be pre-heated, if found desirable, in order to avoid any chilling of the oil by it. Air for atomizing the sprayed base is introduced from a pipe-line 8 provided with a connection 9 for the admixture therewith of inert gas to serve as a regulatory diluent. As shown, the supply of atomizing air is relied on for changing the body of air in the converter 5 to the full extent required, and provision is made for continually drawing off the fume or spent air (which has lost part of its oxygen and has been more or less contaminated with vaporous products) through a pipe-line 10.

As shown, the converter 5 is provided with a jacket 11 adapted to serve as a means of heating the contents of the converter, by circulation therethrough of a heating medium such as steam or hot oil. The temperature thus maintained in the jacket 11 should, of course, correspond in a general way to the temperature and reactive properties of the entering base, in order that the base shall not be flashed or overheated, on the one hand, nor chilled so as to interfere unduly with the reaction, on the other hand. As shown, the heating medium enters the jacket 11 through an inlet pipe 12 at its bottom and leaves it through a discharge pipe 13 having a plurality of valved connections 14 therewith at different levels. When a liquid heating medium is used (such as oil), the level thereof in the jacket 11 may be adjusted and regulated at pleasure by closing all the connections 14 below the level desired. The heating jacket 11 envelops the bottom of the converter 5 as well as its side walls, so that the bottom of the converter may serve as a heated receptacle or reservoir for collecting and temporarily storing the base that has been acted on by the gaseous agent. The base collecting in the bottom of the converter 5 may be brought to a higher temperature than the air in the upper portion thereof, by reason of the more efficient direct transmission of heat from the jacket 11 thereto, and through appropriate regulation of the oil level in the jacket 11 as above described.

In order to obtain some types of products having extremely high melting points, it may be necessary to repeat the treatment described above one or more times. For this purpose, the treated base drawn off from the bottom of the converter 5 through a pipe 15 may be pumped by a pump 16 to the top of another converter 20 constructed and operating like the converter 5, and may be sprayed into the said converter 20 with the aid of air from the same pipe-line 8 that supplies the converter 5. With a suitable number of such converters, the treatment can be carried on progressively and simultaneously in its successive stages, variously oxidized products being thus concurrently obtained by successive treatments of the base in the several converters. Preferably, and with the arrangement shown, these converters will contain independent bodies of suitably heated air; and the base and air in the different converters may be heated to different temperatures as the melting point of the base increases with progressive oxidation. In this way, therefore, a series of products of progressively higher melting points can be concurrently obtained;—the only limit being the ultimate production, when the base has been excessively oxidized, of a cheesy, crumbling mass of no practical utility.

It will be seen that the various pipes and connections are provided with suitable shut-off and control valves for regulating the admission of base and of air to the converters, the admixture of inert gas with the air, and the withdrawal of the treated base from the bottom of each converter. It will be observed that the discharge pipe 15 from the bottom of each converter has two valved outlets 21 and 22, the one leading to the spray pump 16 for the next converter, and the other serving for the withdrawal of any desired amount of the product at any particular stage of treatment.

Having thus described my invention, I claim:—

1. A process for producing blown oil asphalts, of any desired consistency, by chemical condensation substantially without distillation; which process comprises heating oil and spraying the heated oil into a chamber and also supplying a gaseous oxidizing condensation agent thereto, regulating the temperature and the proportions of oil and oxygen to prevent ignition or substantial vaporization of the oil in said chamber.

2. A process of progressively and concurrently producing blown oil asphalts of various consistencies, by chemical condensation substantially without distillation; which process comprises heating oil and spraying the heated oil repeatedly into reaction chambers, and also supplying independent bodies of gaseous oxidizing condensation agent thereto, regulating the temperature and proportions of oil and oxygen to prevent ignition or substantial vaporization of the oil in said chambers.

In testimony whereof, I have hereunto signed my name at Maurer, N. J., this fifteenth day of Sept. 1920.

JOHN STROTHER MILLER, Jr.